(12) United States Patent
Kodaka et al.

(10) Patent No.: US 6,256,584 B1
(45) Date of Patent: Jul. 3, 2001

(54) TRAVEL SAFETY SYSTEM FOR VEHICLE

(75) Inventors: Kenji Kodaka; Tomoyuki Shinmura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/375,219

(22) Filed: Aug. 16, 1999

(30) Foreign Application Priority Data

Aug. 25, 1998 (JP) .................................................. 10-238544

(51) Int. Cl.$^7$ .............................. G06F 17/10; G06G 7/78
(52) U.S. Cl. ............................ 701/301; 701/300; 701/96; 340/903; 340/904; 340/435; 340/436; 342/70; 342/71; 342/72; 180/167; 180/169; 180/272
(58) Field of Search ..................................... 701/301, 300, 701/23, 28, 36, 41, 96; 340/435, 436, 438, 901, 903, 454, 904; 180/167, 168, 169; 342/70, 71, 109, 115, 179

(56) References Cited

U.S. PATENT DOCUMENTS

| 5,343,206 | * | 8/1994 | Ansaldi et al. ........................ 342/70 |
| 5,479,173 | * | 12/1995 | Yoshioka et al. ...................... 342/70 |
| 5,529,138 | * | 6/1996 | Shaw et al. .......................... 180/169 |
| 5,572,428 | * | 11/1996 | Ishida et al. ......................... 701/301 |
| 5,699,040 | * | 12/1997 | Matsuda ............................... 340/435 |
| 5,745,870 | * | 4/1998 | Yamamoto et al. .................. 701/301 |
| 5,925,082 | * | 7/1999 | Shimizu et al. ........................ 701/41 |
| 5,930,739 | * | 7/1999 | Constacis ............................. 702/145 |
| 5,986,601 | * | 11/1999 | Sugimoto ................................ 342/70 |
| 6,018,692 | * | 1/2000 | Shimizu et al. ........................ 701/41 |
| 6,087,975 | * | 7/2000 | Sugimoto et al. ..................... 342/70 |

FOREIGN PATENT DOCUMENTS 7-14100   1/1995   (JP) .

\* cited by examiner

Primary Examiner—Jacques H. Louis-Jacques
(74) Attorney, Agent, or Firm—Arent Fox Kitner Plotkin & Kahn (57) ABSTRACT

A relative lateral deviation calculating device calculates a relative lateral deviation between a vehicle and an on-coming vehicle, based on the state of the on-coming vehicle detected by an object detecting device and a future locus of movement for the vehicle estimated by a movement locus estimating device. When the relative lateral deviation is in a predetermined range, a contact-possibility determining device determines that there is a possibility that the vehicle will come into contact with the on-coming vehicle. Even when the relative lateral deviation is not in the predetermined range, if a steering-state detecting device has detected an involuntary steering operation by a driver, a contact avoiding device increases the steering reaction force of the steering wheel to inhibit the steering operation by the driver in a direction for the vehicle to approach the on-coming vehicle.

3 Claims, 10 Drawing Sheets

TRAVEL SAFETY SYSTEM FOR VEHICLE

BACKGROUND OF THE INVENTION

1. Field of the Invention

The present invention relates to a travel safety system for a vehicle, which is designed to prevent a vehicle from coming into contact with an on-coming vehicle by use of an object detecting means such as a radar device and the like.

2. Description of the Related Art

Travel safety systems for vehicles are already known from Japanese Patent Application Laid-open No.7-14100. The system described in this Japanese Publication is designed, so that when there is a possibility of the vehicle traveling into an on-coming lane to collide with an on-coming vehicle, a warning for alerting a driver for a spontaneous collision-avoiding operation, is emitted, or the vehicle is braked automatically, thereby avoiding the collision of the vehicle with the on-coming vehicle.

For example, a driver may operate a steering wheel involuntarily in some cases, while he or she is operating a switch for an audio device, or while he or she is driving the vehicle inattentively, whereby the vehicle may enter the on-coming lane. When the driver'consciousness is not concentrated on the driving of the vehicle, as described above, even if the driver tries to avoid the collision by a normal warning or by an automatic steering operation, there is a possibility that the response of the driver himself or herself to the warning or the automatic steering operation is too late, whereby the collision avoiding operation is not in time for avoidance of the collision, as compared with a case where the driver's consciousness is concentrated on the driving of the vehicle.

SUMMARY OF THE INVENTION

Accordingly, it is an object of the present invention to reliably prevent contact of the vehicle with the on-coming vehicle due to the involuntary steering operation by the driver.

To achieve the above object, according to a first aspect and feature of the present invention, there is provided a travel safety system for a vehicle, comprising an object detecting means for detecting an object existing in the direction of movement of the vehicle, a movement locus estimating means for estimating a future locus of movement for the vehicle, and a relative lateral deviation calculating means for calculating a relative lateral deviation between the vehicle and an on-coming vehicle, based on the result of detection by the object detecting means and the future locus of movement for the vehicle. A contact-possibility determining means determines whether there is a possibility that the vehicle will come into contact with the on-coming vehicle, based on the relative lateral deviation calculated by the relative lateral deviation calculating means, and a steering-state detecting means for detecting the involuntary steering operation by the driver in the direction for the vehicle to approach the on-coming vehicle. The determining means determines that there is a possibility of contact, when the relative lateral deviation is in a predetermined range, and determines that there is a possibility of contact, when the relative lateral deviation is not in the predetermined range but the steering-state detecting means has detected the involuntary steering operation by the driver in the direction for the vehicle to approach the on-coming vehicle.

With the above arrangement, the relative lateral deviation calculating means calculates the relative lateral deviation between the vehicle and the on-coming vehicle, based on the state of the on-coming vehicle detected by the object detecting means and the future locus of movement for the vehicle estimated by the movement locus estimating means. When the relative lateral deviation is in the predetermined range, the contact-possibility determining means determines that there is a possibility that the vehicle will come into contact with the on-coming vehicle. Even when the relative lateral deviation is not in the predetermined range, the contact-possibility determining means determines that there is a possibility that the vehicle will come into contact with the on-coming vehicle, if the steering-state detecting means has detected the involuntary steering operation by the driver in the direction for the vehicle to approach the on-coming vehicle. Therefore, it is possible to prevent the vehicle from coming into contact with the on-coming vehicle due to the involuntary steering operation by the driver.

According to a second aspect and feature of the present invention, the travel safety system for the vehicle further includes a contact avoiding means for automatically carrying out a contact avoiding operation, when the relative lateral deviation is not in the predetermined range and the steering-state detecting means has detected the involuntary steering operation by the driver in the direction for the vehicle to approach the on-coming vehicle.

With the above arrangement, when the contact-possibility determining means determines that there is a possibility that the vehicle will come into contact with the on-coming vehicle, the contact avoiding means carries out the contact avoiding operation automatically. Therefore, it is possible to reliably prevent the vehicle from coming into contact with the on-coming vehicle due to the involuntary steering operation by the driver in the direction for the vehicle to approach the on-coming vehicle.

According to a third aspect and feature of the present invention, the contact avoiding means inhibits the involuntary steering operation by the driver in the direction for the vehicle to approach the on-coming vehicle.

With the above arrangement, when the contact-possibility determining means determines that there is a possibility that the vehicle will come into contact with the on-coming vehicle, the contact avoiding means inhibits the involuntary steering operation by the driver in the direction for the vehicle to approach the on-coming vehicle. Therefore, it is possible to reliably prevent the vehicle from coming into contact with the on-coming vehicle due to the involuntary steering operation.

According to a fourth aspect and feature of the present invention, the contact avoiding means ensures that as the degree of approach of the vehicle to the on-coming vehicle due to the involuntary steering operation by the driver becomes larger, the steering assisting force generated by the steering device is corrected to be decreased.

With the above arrangement, as the degree of approach of the vehicle to the on-coming vehicle due to the involuntary steering operation by the driver becomes larger, the steering assisting force generated by the steering device is decreased. Therefore, the steering reaction force received by the driver is increased to reliably inhibit the steering operation in the direction for the vehicle to approach the on-coming vehicle.

According to a fifth aspect and feature of the present invention, the contact avoiding means ensures that as the relative distance between the vehicle and the on-coming vehicle becomes smaller, or as the relative speed between the vehicle and the on-coming vehicle becomes larger, the steering assisting force generated by the steering device is corrected to be decreased.

With the above arrangement, as the relative distance between the vehicle and the on-coming vehicle becomes smaller, or as the relative speed between the vehicle and the on-coming vehicle becomes larger, the steering assisting force generated by the steering device is decreased. Therefore, when it is believed that the possibility of contact is higher, the steering reaction force received by the driver is increased to reliably inhibit the steering operation in the direction for the vehicle to approach the on-coming vehicle.

According to a sixth aspect and feature of the present invention, the steering-state detecting means detects the involuntary steering operation by the driver, when the time-variation rate in steering torque and the time-variation rate in steering angle input to the steering wheel by the driver, are equal to or smaller than predetermined values.

With the above arrangement, when the time-variation rate in steering torque and the time-variation rate in steering angle input to the steering wheel by the driver are equal to or smaller than the predetermined values, the involuntary steering operation by the driver is detected. Therefore, it is possible to reliably discriminate the spontaneous steering operation from the involuntary steering operation by the driver.

The above and other objects, features and advantages of the invention will become apparent from the following description of the preferred embodiment taken in conjunction with the accompanying drawings.

BRIEF DESCRIPTION OF THE DRAWINGS

FIGS. 1 to 11 show an embodiment of the present invention, wherein:

DESCRIPTION OF THE PREFERRED EMBODIMENT

The present invention will now be described by way of an embodiment with reference to the accompanying drawings.

Figure 1:
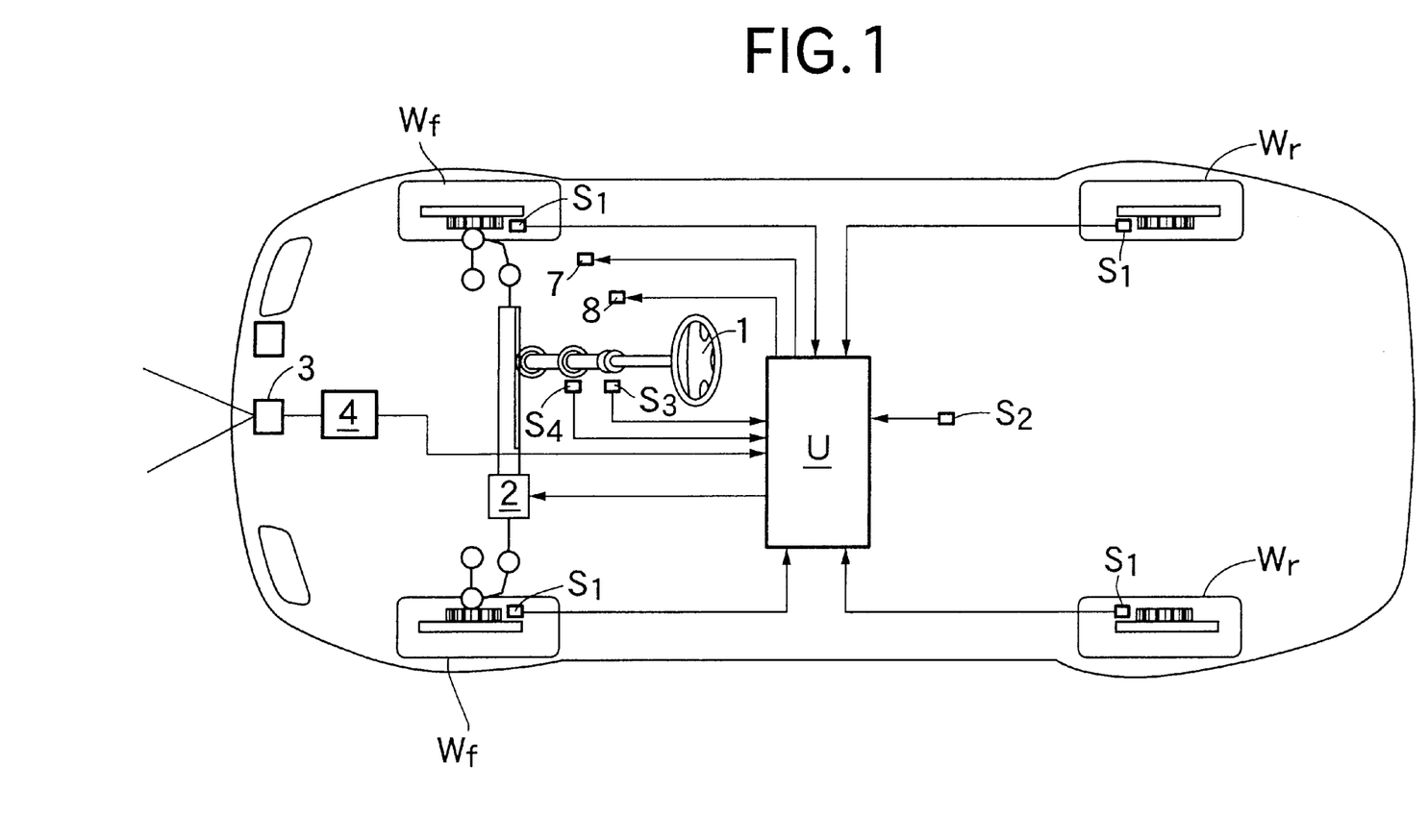
FIG. 1 is an illustration of the entire arrangement of a vehicle provided with a travel safety system.
Figure 2:
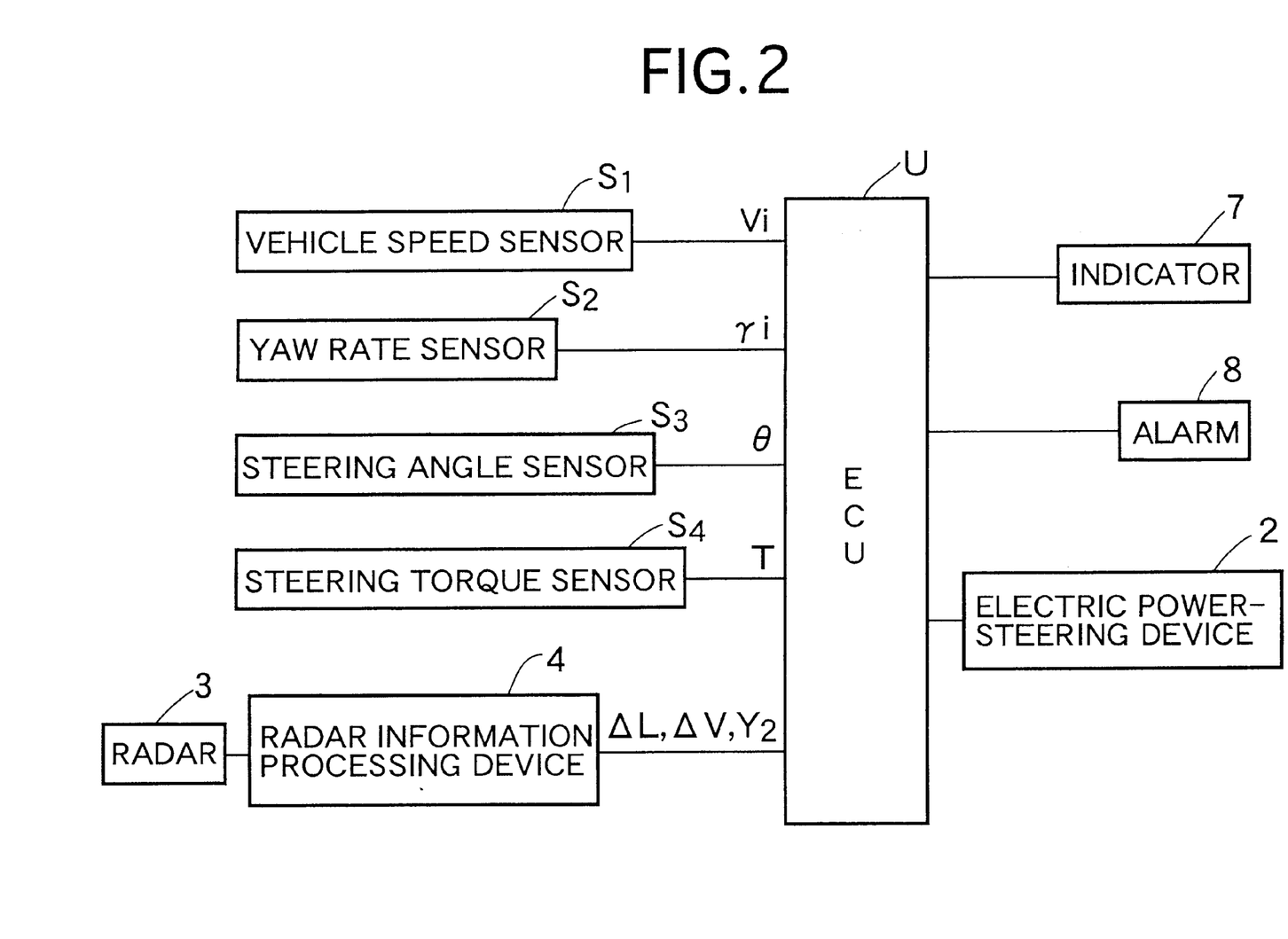
FIG. 2 is a block diagram of the travel safety system.

As shown in FIGS. 1 and 2, a vehicle including left and right front wheels Wf, Wf and left and right rear wheels Wr, Wr includes a steering wheel 1 for steering the left and right front wheels Wf, Wf which are the steering wheels, and an electric power-steering device 2 adapted to generate a steering force for assisting a driver in the operation of the steering wheel 1, and a steering reaction force for avoiding the collision of the vehicle. Inputs to an electronic control unit U for controlling the operation of the electric power-steering device 2 which is a steering device of the present invention, are signals from a radar information processing device 4 connected to a radar 3, vehicle speed sensors $S_1$ for detecting rotational speeds of the wheels Wf, Wf, Wr, Wr, a yaw rate sensor $S_2$ for detecting the yaw rate of a vehicle body, a steering angle sensor $S_3$ for detecting the steering angle of the steering wheel 1, and a steering torque sensor 4 for detecting the steering torque applied to the steering wheel 1 by the driver. The electronic control unit U controls the operation of the electric power-steering device 2 based on the signals from the radar information processing device 4 and the sensors $S_1$, $S_2$, $S_3$ and $S_4$, and also controls the operation of an indicator 7 comprising a liquid crystal display and an alarm 8 comprising a buzzer or a lamp.

Figure 3:
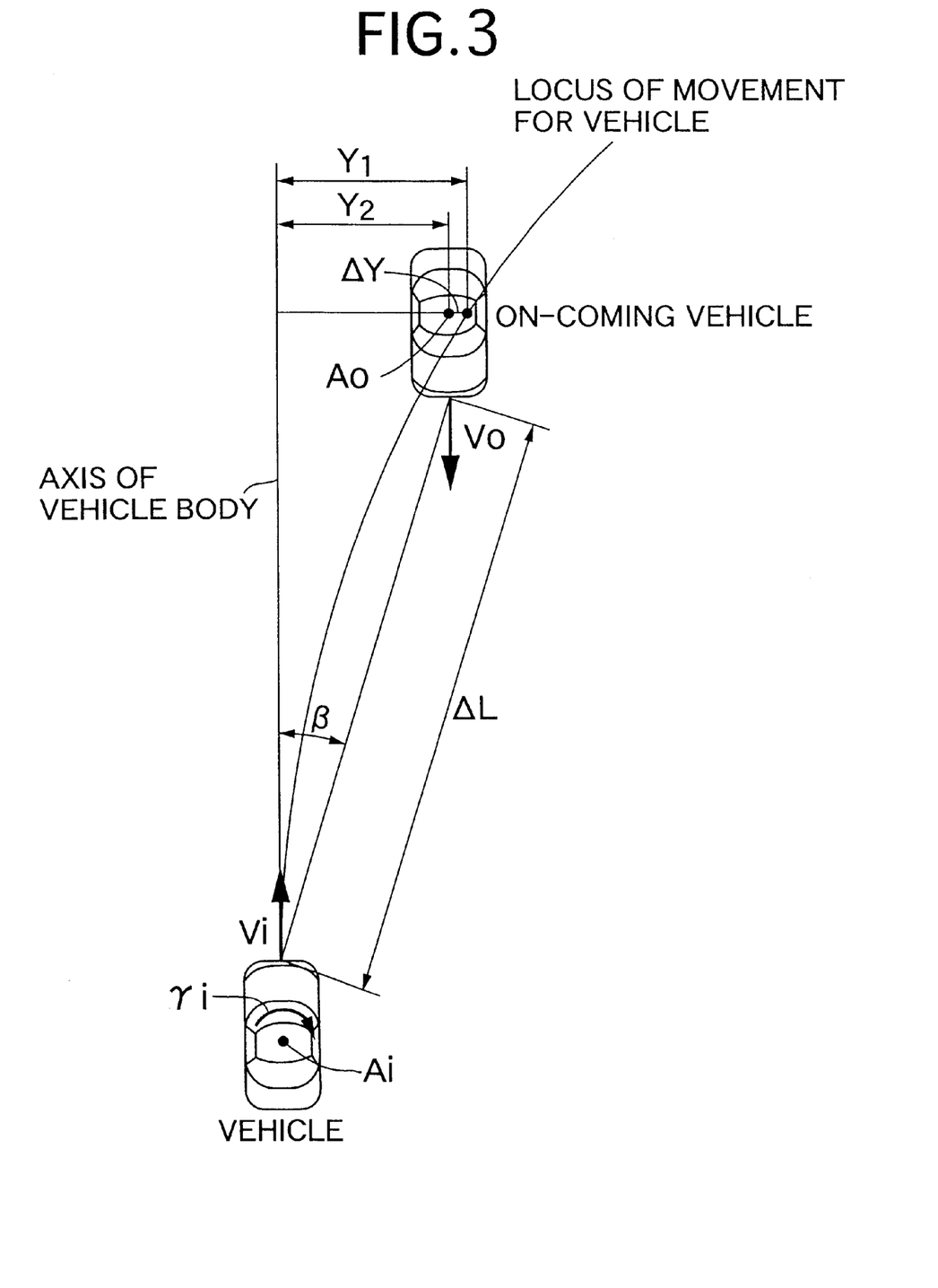
FIG. 3 is an illustration showing the relative relationship between a vehicle Ai and an on-coming vehicle Ao.

The radar 3 transmits an electromagnetic wave toward a lateral predetermined area ahead of the vehicle and receives a reflection wave resulting from the reflection of the electromagnetic wave from an object. The radar information processing device 4 which is the object detecting means of the present invention, calculates a relative positional relationship between the vehicle Ai and an on-coming vehicle Ao, based on the signal from the radar 3. As shown in FIG. 3, the relative positional relationship between the vehicle Ai and the on-coming vehicle Ao includes a relative speed $\Delta V$ between the vehicle Ai and the on-coming vehicle Ao (i.e., a difference between a vehicle speed Vi of the vehicle Ai and a vehicle speed Vo of the on-coming vehicle Ao), and a relative lateral distance $Y_2$ of the on-coming vehicle Ao relative to an axis of the vehicle body of the vehicle Ai. The relative lateral distance $Y_2$ can be calculated based on an angle $\beta$ formed by the on-coming vehicle Ao with respect to the axis of the vehicle body of the vehicle Ai, and a relative distance $\Delta L$ between the vehicle Ai and the on-coming vehicle Ao. The radar 3 detects a vehicle traveling ahead of the vehicle (which will be referred to hereinafter as a preceding vehicle) and a stationary object on a road in addition to the on-coming vehicle Ao, and can discriminate the on-coming vehicle Ao from the preceding vehicle and the stationary object, based on the magnitude of a relative speed $\Delta V$. In the embodiment of the present invention, a millimeter radar is used which is capable of detecting the relative relationship $\Delta L$, $\Delta V$ and $\beta$) between the vehicle Ai and the on-coming vehicle Ao by one run of transmission and reception of a millimeter wave.

Figure 4:
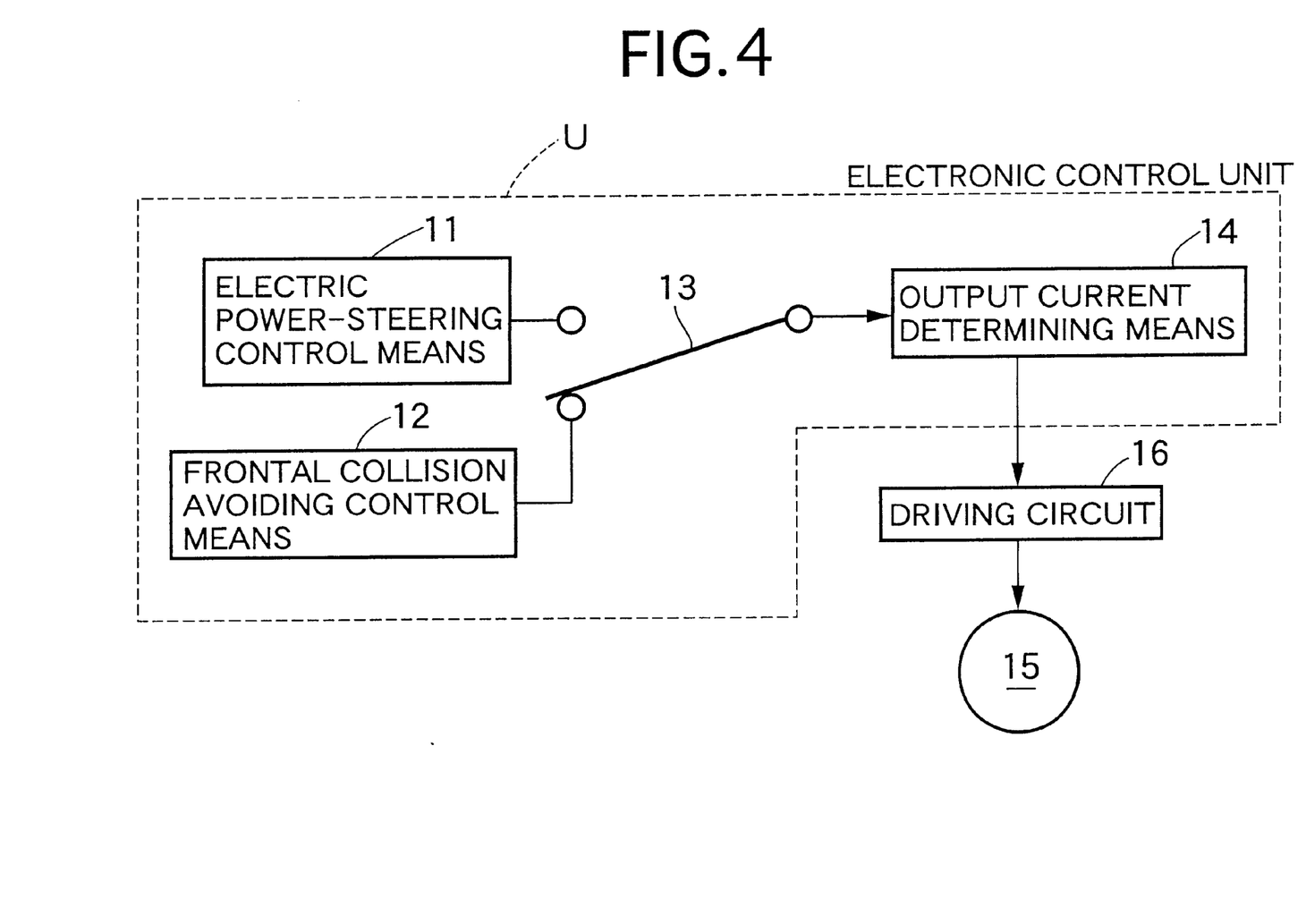
FIG. 4 is a diagram for explaining the function of an electronic control unit.

As shown in FIG. 4, the electronic control unit U includes an electric power-steering control means 11, a frontal collision avoiding control means 12, a switch-over means 13, and an output current determining means 14. In a normal state, the switch-over means 13 is connected to the electric power-steering control means 11, and the electric power-steering device 2 exhibits a normal power-steering function. More specifically, the output current determining means 14 determines a current to be outputted to an actuator 15 in accordance with the steering torque input to the steering wheel 1 and the vehicle speed, and this current is outputted to the actuator 15 through a drive circuit 16, thereby assisting in the operation of the steering wheel 1 conducted by the driver. On the other hand, when there is a possibility that the vehicle Ai will collide frontally against an on-coming vehicle Ao, the switch-over means 13 is connected to the frontal collision avoiding control means 12, and the driving of the actuator 15 is controlled by the frontal collision avoiding control means 12, whereby a steering reaction force control operation is performed for avoiding the frontal collision of the vehicle Ai with the on-coming vehicle Ao. The content of the steering reaction force control operation will be described hereinafter.

Figure 5:
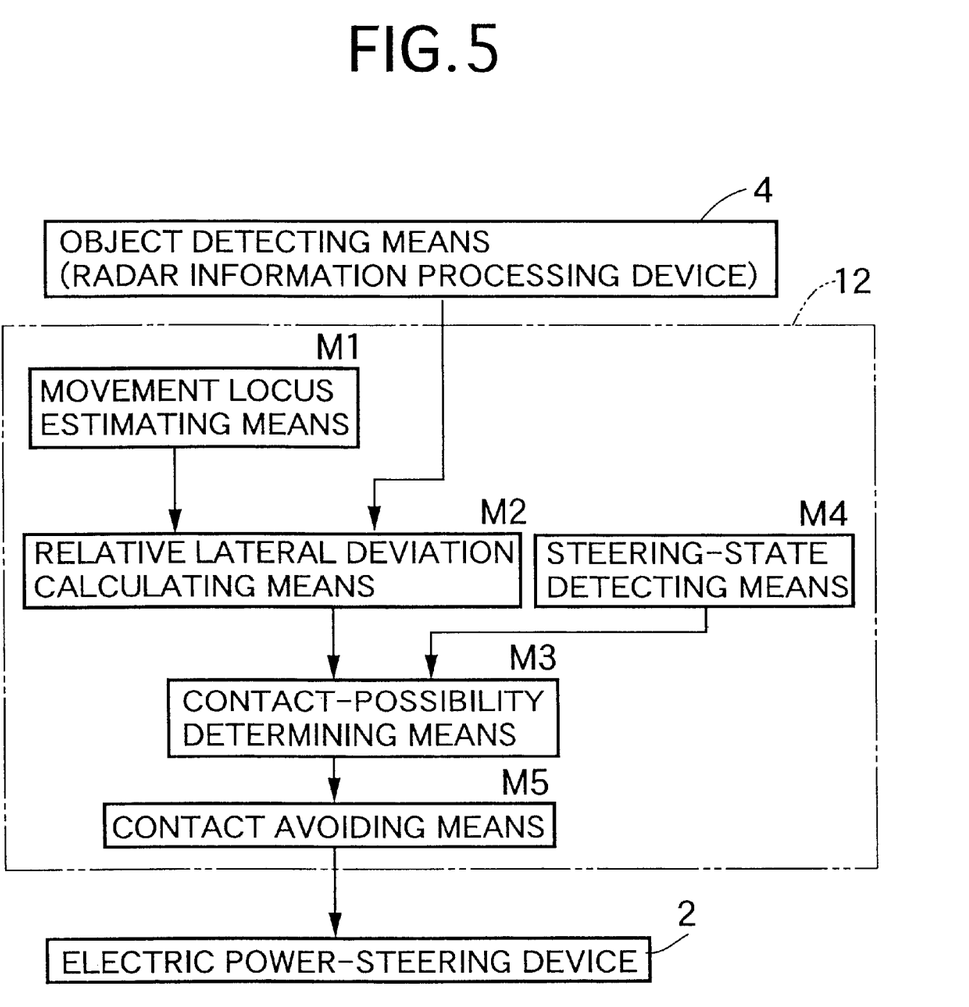
FIG. 5 is a block diagram showing a circuit of a frontal collision avoiding control means.

As shown in FIG. 5, a movement locus estimating means M1, a relative lateral deviation calculating means M2, a contact-possibility determining means M3, a steering-state detecting means M4 and a contact avoiding means M5 are provided in the frontal collision avoiding control means 12 of the electronic control unit U.

The movement locus estimating means M1 estimates a future movement locus for the vehicle Ai based on the vehicle speed Vi and a yaw rate γi of the vehicle Ai. The relative lateral deviation calculating means M2 calculates a relative lateral deviation ΔY between the vehicle Ai and the on-coming vehicle Ao, based on the future movement locus for the vehicle Ai (i.e., the lateral movement amount $Y_1$), the relative distance ΔL, the relative speed ΔV and the angle β detected between the vehicle Ai and the on-coming vehicle Ao by the object detecting means 4 (the radar information processing device 4). The contact-possibility determining means M3 determines that there is a possibility of contact between the vehicle Ai and the on-coming vehicle Ao, when the relative lateral deviation ΔY is in a range of $-\epsilon \leq \Delta Y \leq \epsilon$. At this time, when the steering-state detecting means M4 detects an involuntary steering operation by the driver, the contact-possibility determining means M3 determines that there is a possibility of contact, even if the relative lateral deviation ΔY is not in the range of $-\epsilon \leq \Delta Y \leq \epsilon$, whereby a contact avoiding operation is carried out by the contact avoiding means M5 to avoid the contact of the vehicle Ai with the on-coming vehicle Ao due to the involuntary steering operation.

The operation of the embodiment of the present invention will be described below with reference to a flow chart shown in FIG. 6.

Figure 6:
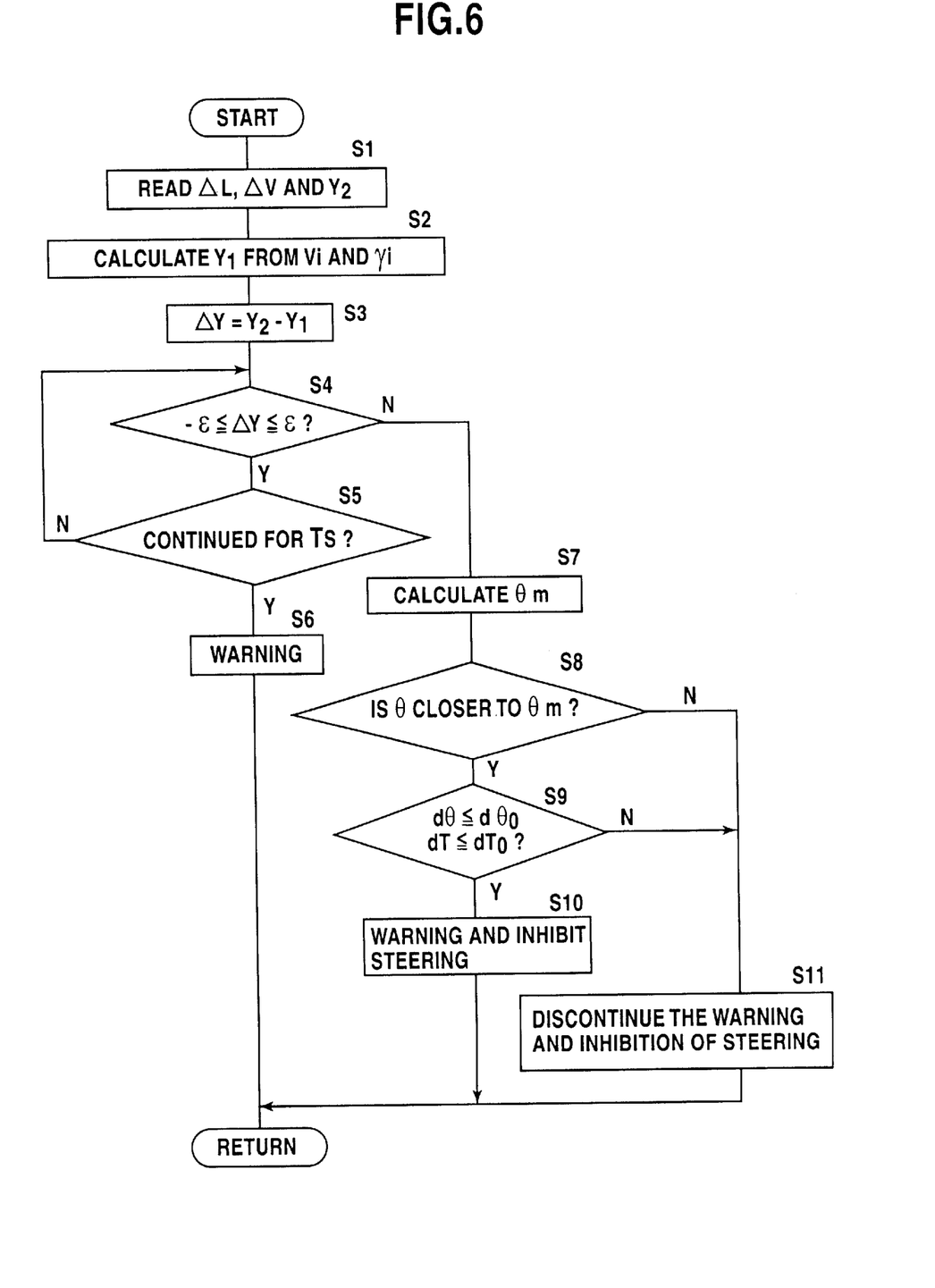
FIG. 6 is a flow chart of a frontal collision avoiding control routine.

First, at Step S1 of the flow chart shown in FIG. 6, the relative distance ΔL between the vehicle Ai and the on-coming vehicle Ao, the relative speed ΔV between the vehicle Ai and the on-coming vehicle Ao and the relative lateral distance $Y_2$ from the axis of the vehicle body of the vehicle Ai to the on-coming vehicle Ao are read in the electronic control unit U from the radar information processing device 4. Then, at Step S2, the lateral movement amount $Y_1$ is calculated based on the vehicle speed Vi of the vehicle Ai detected by the vehicle speed sensors $S_1$ and the yaw rate βi of the vehicle Ai detected by the yaw rate sensor $S_2$. As shown in FIG. 3, the lateral movement amount $Y_1$ is the lateral movement amount generated at the time when the vehicle Ai has moved to a current position of the on-coming vehicle Ao. The lateral movement amount $Y_1$ is calculated in the following manner: A time $t_1$ taken to a time point when the vehicle Ai will reach the position of the on-coming vehicle Ao, is given by a value ΔL/Vi resulting from dividing the relative distance ΔL by the vehicle speed Vi of the vehicle Ai. Therefore, the lateral movement amount $Y_1$ of the vehicle Ai upon lapse of the time $t_1=\Delta L/Vi$ is provided using the vehicle speed Vi of the vehicle Ai and the yaw rate γi of the vehicle Ai according to the following equation:

$$Y_1=(\tfrac{1}{2})\cdot Vi\cdot \gamma i\cdot (\Delta L/Vi)^2 \tag{1}$$

At subsequent Step S3, a relative lateral deviation ΔY is calculated by subtracting the lateral movement amount $Y_1$ from the relative lateral distance $Y_2$.

$$\Delta Y=Y_2-Y_1 \tag{2}$$

As can be seen from FIG. 3, the relative lateral deviation ΔY corresponds to the lateral deviation between the current position of the on-coming vehicle Ao and the presumed position of the vehicle Ai, when the vehicle Ai has been moved to the current position of the on-coming vehicle Ao. The relative lateral deviation Y has a positive or negative value. Given a left-side drive road in the present invention, if $Y_2>Y_1$ and the relative lateral deviation ΔY is positive, the estimated movement locus for the vehicle Ai passes on the left of the current position of the on-coming vehicle. If $Y_2<Y_1$ and the relative lateral deviation ΔY is negative, the estimated movement locus for the vehicle Ai passes on the right of the current position of the on-coming vehicle. The smaller the absolute value of the relative lateral deviation ΔY, the higher the possibility that the vehicle Ai will come into contact with the on-coming vehicle Ao.

Subsequently, at Step S4, it is determined whether the relative lateral deviation ΔY is in a preset range. More specifically, if the relative lateral deviation ΔY is in a predetermined range based on a value G (e.g., 2 m) previously set based on the lateral width of the vehicle body, the following equation is established:

$$-\epsilon \leq \Delta Y \leq \epsilon \tag{3}$$

and it is determined at a first stage that there is a possibility that the vehicle Ai will come into contact with the on-coming vehicle Ao. On the other hand, if the equation (3) is not established, it is determined that the vehicle Ai will pass on the left or right of the on-coming vehicle Ao and thus, will not come into contact with the on-coming vehicle Ao, and a warning for avoiding the collision is not carried out, proceeding to Step S7.

If a state, in which the equation (3) is established, has been continued for a period exceeding a predetermined period of time Ts at subsequent Step S5, it is finally determined that there is a possibility that the vehicle Ai will come into contact with the on-coming vehicle Ao. On the other hand, if the state in which the equation (3) is established has not continued for a predetermined period of time Ts, the processing is returned to Step S4 at which it is again determined whether the equation (3) is established. If before the lapse of the predetermined period of time Ts, there is a time during which equation (3) is not established, the answer at Step S4 is NO, and the process proceeds to Step S7. The predetermined period of time Ts is a variable value and given according to the following equation:

$$Ts=Ts_o\cdot K_1\cdot K_2 \tag{4}$$

wherein $Ts_o$ is a reference value; and each of $K_1$ and $K_2$ is a correcting factor.

Figure 7A:
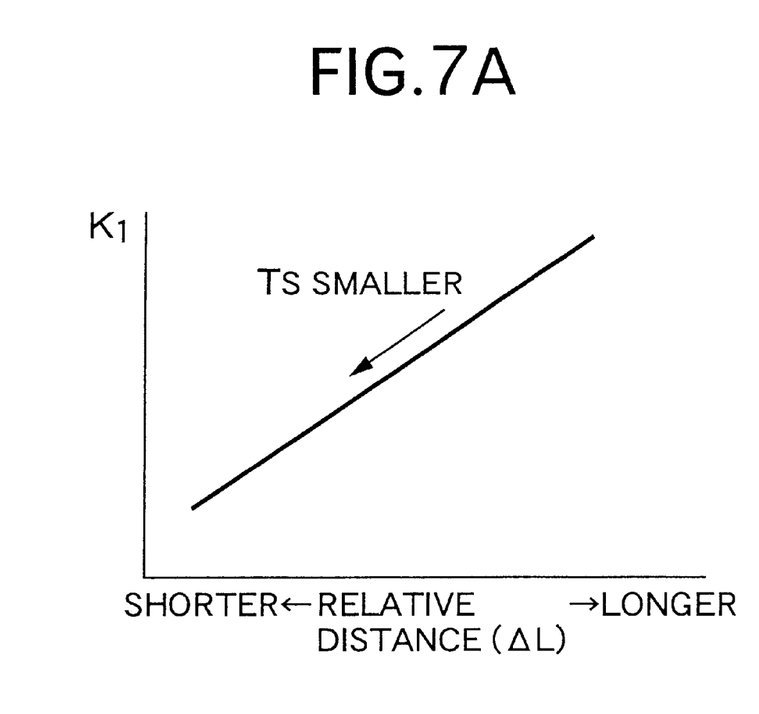
FIGS. 7A and 7B are maps for searching correcting factors $K_1$ and $K_2$ for a predetermined period of time Ts for determining a possibility of collision.
Figure 7B:
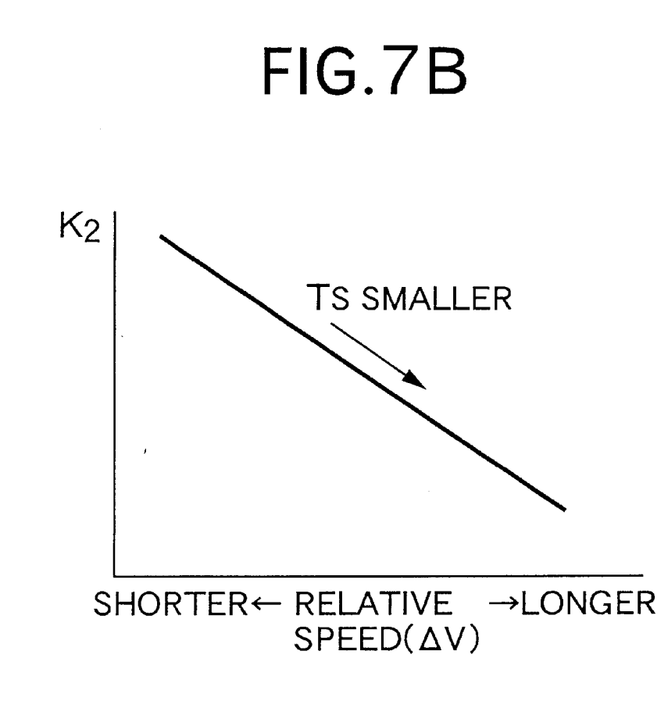
Figure 8:
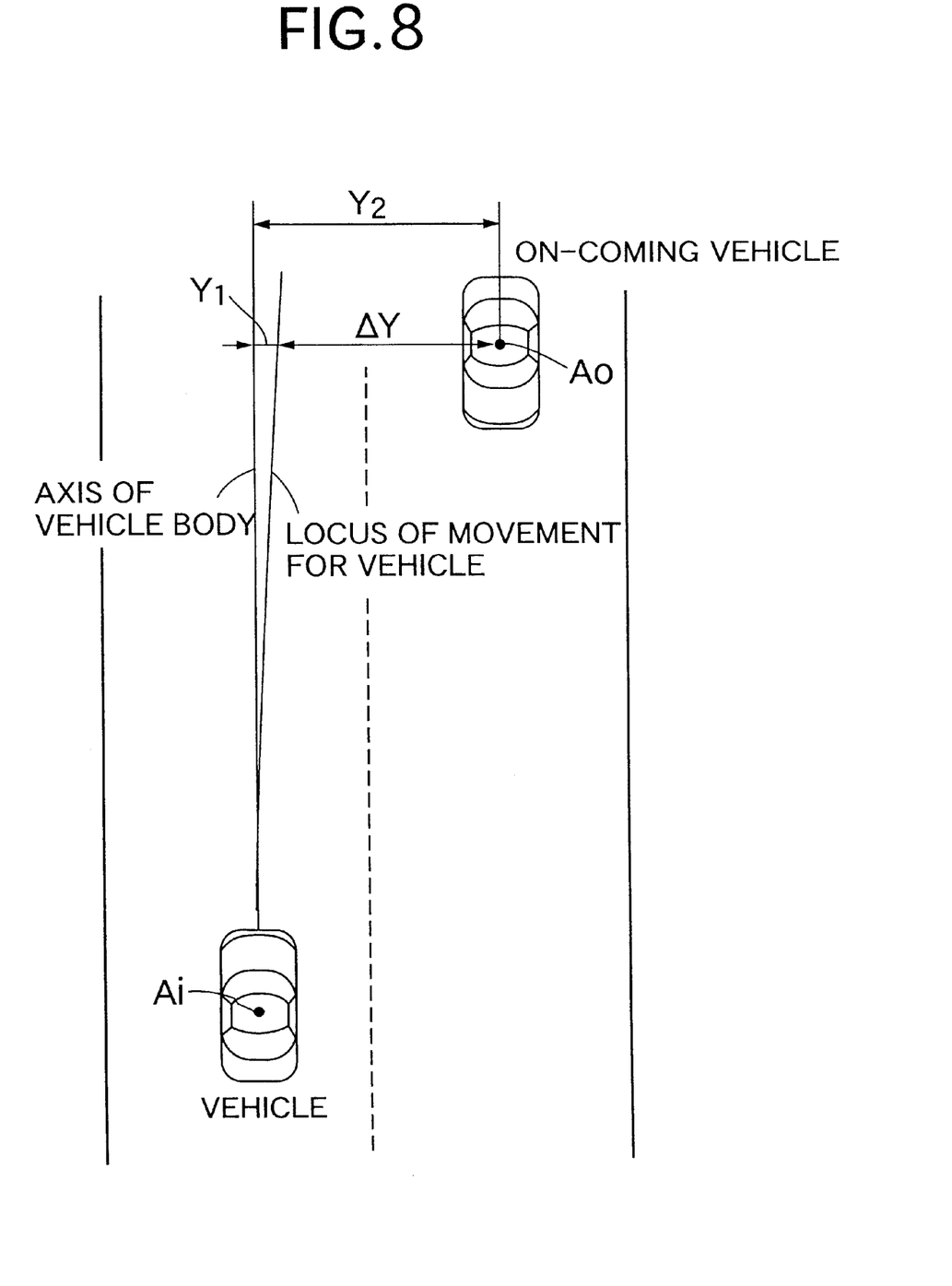
FIG. 8 is an illustration showing the relative relationship between the vehicle Ai and the on-coming vehicle Ao when the possibility of collision is lower.

As shown in FIGS. 7A and 7B, the correcting factors $K_1$ and $K_2$ are searched from a map with a relative distance ΔL and a relative speed ΔV between the vehicle Ai and the on-coming vehicle Ao used as parameters. When the possibility of contact is increased due to a smaller relative distance L or due to a larger relative speed ΔV, the predetermined period of time Ts is corrected to be shortened. This ensures that when the possibility of contact is increased, the warning for avoiding the collision can be easily carried out to reliably avoid the collision of the vehicle Ai against the on-coming vehicle Ao.

If the state in which the equation (3) is established, has been continued for a period exceeding the predetermined period of time Ts at Step S5, the indicator 7 and the alarm 8 are operated at Step S6 to emit a warning to alert the driver for a spontaneous collision-avoiding operation.

When the equation (3) is not established at Step S4, i.e., when the relative lateral deviation ΔY is larger than the predetermined value ε because the lateral movement amount $Y_1$ is sufficiently smaller than the relative lateral distance $Y_2$ and thus, there is not a possibility of collision, a control is carried out for inhibiting the operation of the steering wheel 1 carried out involuntarily in the direction of movement of the vehicle Ai toward the on-coming vehicle Ao by the driver. Such a situation can be produced, for example, when the driver operates a switch for an audio device during driving of the vehicle, or when the driver is driving the vehicle inattentively.

Therefore, at Step S7, a steering angle θm is calculated, which causes a degree of collision danger to be produced when the driver has involuntarily conducted the steering operation in a direction to approach the on-coming vehicle Ao. The steering angle θm is defined as a steering angle θ which ensures that the lateral movement amount $Y_1$ is equal to the relative lateral distance $Y_2$ and the relative lateral deviation ΔY is 0. If a yaw rate increment will cause a lateral movement amount $ΔY_1$ to be produced is represented by Δγi, the following equation is established from the equation (1):

$$ΔY_1 = (½) \cdot Vi \cdot Δγi \cdot t_0^2 \quad (5)$$

If the equation (5) is solved for the yaw rate increment Δi, the following equation is established:

$$Δγi = 2ΔY_1/(Vi \cdot t_0^2) \quad (6)$$

wherein $t_0$ is the period of time to a time point when the vehicle Ai will come into contact with the on-coming vehicle Ao. The period of time $t_0$ is given according to the following equation using a relative distance L and a relative speed V between the vehicle Ai and the on-coming vehicle:

$$t_0 = ΔL/ΔV \quad (7)$$

On the other hand, if the yaw rate increment Δi is expressed using the vehicle speed Vi, a stability factor A, a wheel base WB, a steering angle increment Δθ and a steering gear ratio N, the following equation is given:

$$Δγi = \{1/(1 + A \cdot Vi^2)\} \cdot (Vi/WB) \cdot (Δθ/N) \quad (8)$$

If the equation (8) is solved for the steering angle increment Δθ the following equation is provided:

$$Δθ = N \cdot (WB/Vi) \cdot (1 + A \cdot Vi^2) \cdot Δγi \quad (9)$$

If the yaw rate increment Δγi in the equation (6) is substituted into the equation (9), the following equation is provided:

$$Δθ = 2N \cdot (WB/Vi) \cdot (1 + A \cdot Vi^2) \cdot \{ΔY_1/(Vi \cdot t_0^2)\} \quad (10)$$

Therefore, when the steering angle θ approaches a steering angle θm=(θn+θ) resulting from addition of the steering angle increment Δθ to a current steering angle θn as a result of the steering operation involuntarily carried out by the driver, the possibility of collision is increased.

If the steering angle θ approaches the steering angle θm at Step S8 to increase the possibility of collision, a steering angle variation rate dθ which is a time-differentiated value of a steering angle θ detected by the steering angle sensor $S_3$ and a steering torque variation rate dT which is a time-differentiated value of a steering torque T detected by the steering torque sensor $S_4$, are calculated and compared with threshold values $dθ_0$ and $dT_0$ at Step S9, respectively. The threshold values $dθ_0$ and $dT_0$ are experimentally calculated values and determined from values when the driver involuntarily operates the steering wheel 1 due to inattentive driving or the like.

If the steering angle variation rate dθ is equal to or smaller than the threshold value $dθ_0$ and the steering torque variation rate dT is equal to or smaller than the threshold value $dT_0$ at Step S9, it is determined that the steering has been conducted involuntarily by the driver, and a warning is emitted and the steering reaction force control operation is carried out at Step S10. On the other hand, if at least one of the steering angle variation rate dθ and the steering torque variation rate dT exceeds the threshold value $dθ_0$ and $dT_0$, it is determined that the steering has been voluntary by the driver, and the steering reaction force control operation is discontinued at Step S11 to avoid the interference with the spontaneous steering operation by the driver.

The steering reaction force control operation at the time when the spontaneous steering operation involuntarily by the driver has been detected will be described below.

The steering reaction force control operation supplies current to the actuator 15 of the electric power-steering device 2 to generate a steering reaction force opposed to the involuntary steering operation by the driver, thereby preventing the steering from being conducted in the direction for the vehicle Ai to approach the on-coming vehicle Ao.

Figure 9:
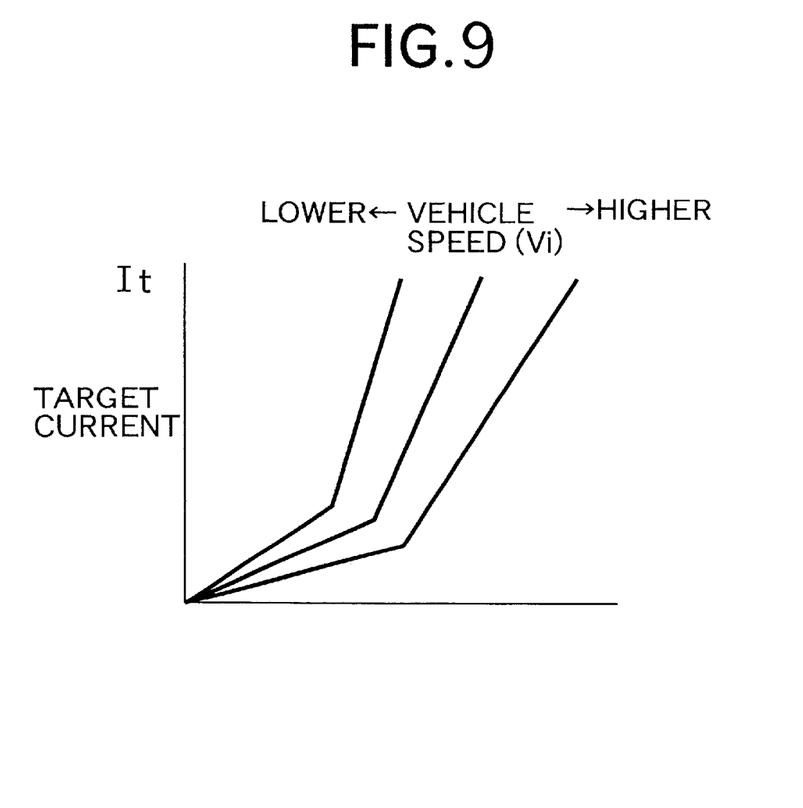
FIG. 9 is a map for searching a target current It from a steering torque T and a vehicle speed Vi.

A map shown in FIG. 9 is used to search a target current It for the actuator 15, based on the steering torque T detected by the steering torque sensor $S_4$ and the vehicle speed Vi detected by the vehicle speed sensors $S_1$, when the electric power-steering device 2 exhibits a normal steering assisting function. As can be seen from FIG. 9, the target current It for the actuator 15 is set so that it is increased with an increase in steering torque T and increased with a decrease in vehicle speed Vi.

Figure 10:
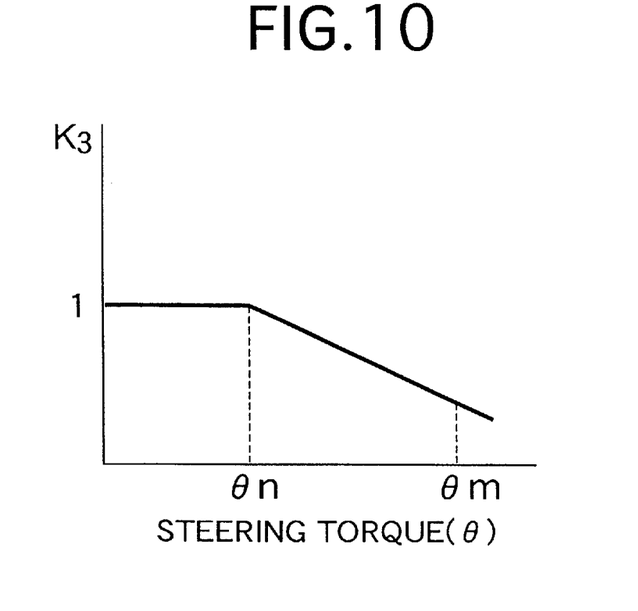
FIG. 10 is a map for searching a correcting factor $K_3$ for the target current It.

When the steering reaction force for preventing the collision is generated in the electric power-steering device 2, the target current It is corrected in a decreasing direction by multiplying the target current It by a correcting factor $K_3$ (≦1) searched from a map shown in FIG. 10. The map for the correcting factor $K_3$ is made with the steering angle θ used as a parameter. As the steering angle θ approaches the above-described steering angle θm=(θn+Δθ) from the current steering angle θn, the correcting factor $K_1$ is decreased from 1. Thus, the steering assisting force generated by the electric power-steering device 2, and a steering reaction force opposed to the steering conducted by the driver is generated to prevent the collision of the vehicle Ai against the on-coming vehicle Ao.

If the target current It is corrected according to the following equation by other correcting factors $K_4$ and $K_5$ in addition to the correcting factor $K_3$, a collision preventing control operation having a higher accuracy can be carried out:

$$It = K_3 \cdot K_4 \cdot K_5 \quad (11)$$

Figure 11A:
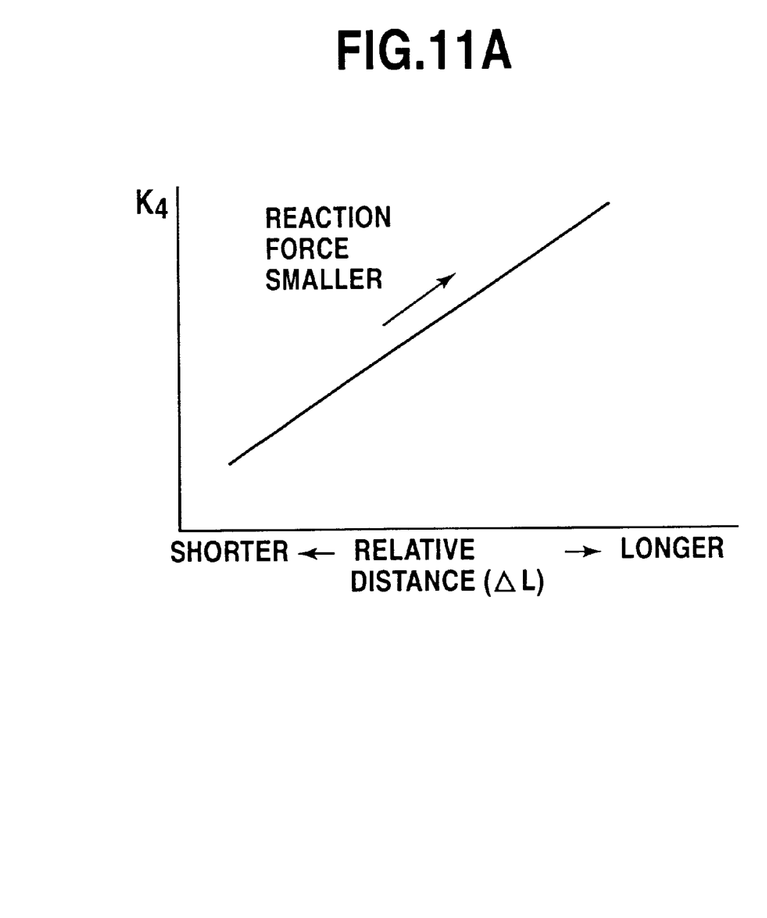
FIGS. 11A and 11B are maps for searching correcting factors $K_4$ and $K_5$ for the target current It.
Figure 11B:
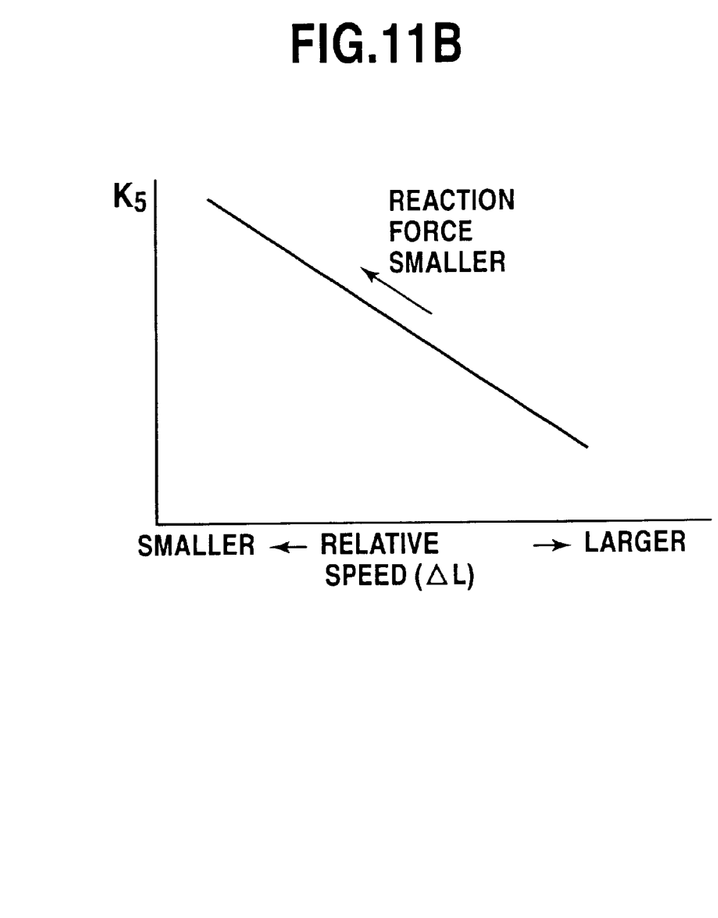

As shown in FIGS. 11A and 11B, the correcting factors $K_4$ and $K_5$ are searched from a map made with the relative distance ΔL and the relative speed ΔV between the vehicle Ai and the on-coming vehicle Ao used as parameters. When the possibility of collision is lower due to a smaller relative speed ΔV, the target current It is corrected in an increasing direction, namely, the steering reaction force is corrected in a decreasing direction, as compared with the case where the possibility of collision is higher. In other words, when the possibility of collision is higher, the steering reaction force can be increased, thereby reliably preventing the involuntary steering operation in the direction for the vehicle Ai to approach the on-coming vehicle Ao.

The steering angle θm has been defined as the steering angle θ ensuring that the relative lateral deviation ΔY will be 0 (zero) in the above embodiment, but the steering θm may be defined as a steering angle θ ensuring the establishment of $-\epsilon \leq \Delta Y \leq \cdot \epsilon$.

Although the embodiment of the present invention has been described in detail, it will be understood that the present invention is not limited to the above-described embodiment, and various modifications in design may be made without departing from the spirit and scope of the invention defined in claims.

What is claimed is:

1. A travel safety system for a vehicle, comprising:

an object detecting means for detecting an object existing in the direction of movement of the vehicle;

a movement locus estimating means for estimating a future locus of movement for the vehicle;

a relative lateral deviation calculating means for calculating a relative lateral deviation between the vehicle and an on-coming vehicle, based on the result of the detection by said object detecting means and the future locus of movement for the vehicle;

a contact-possibility determining means for determining whether there is a possibility that the vehicle will come into contact with the on-coming vehicle, based on the relative lateral deviation calculated by said relative lateral deviation calculating means;

a steering-state detecting means for detecting an involuntary steering operation by a driver in a direction for the vehicle to approach the on-coming vehicle; and a contact avoiding means for automatically carrying out a contact avoiding operation;

wherein said contact-possibility determining means determines that there is a possibility of contact, when the relative lateral deviation is in a predetermined range, or when the relative lateral deviation is not in a predetermined range and said steering-state detecting means has detected an involuntary steering operation by the driver in the direction for the vehicle to approach the on-coming vehicle, wherein said contact avoiding means carries out a contact avoiding operation when the relative lateral deviation is not in the predetermined range and said steering-state detecting means has detected an involuntary steering operation by the driver in the direction for the vehicle to approach the on-coming vehicle, wherein said contact avoiding means inhibits said involuntary steering operation by the driver in the direction for the vehicle to approach the on-coming vehicle, and wherein said contact avoiding means decreases the steering assisting force generated by the steering device, as the degree of approach of the vehicle to the on-coming vehicle due to the involuntary steering operation by the driver becomes larger.

2. A travel safety system for a vehicle according to claim 1, wherein said contact avoiding means decreases the steering assisting force generated by the steering device, as the relative distance between the vehicle and the on-coming vehicle becomes smaller, or as the relative speed between the vehicle and the on-coming vehicle becomes larger.

3. A travel safety system for a vehicle according to claim 1, wherein said steering-state detecting means detects an involuntary steering operation by the driver, when the time-variation rate in steering torque and the time-variation rate in steering angle inputted to the steering wheel by the driver, are equal to or less than predetermined values.

* * * * *